(12) United States Patent
Xie et al.

(10) Patent No.: US 12,179,260 B2
(45) Date of Patent: Dec. 31, 2024

(54) VENTILATING STOPPER ROD WITH TEMPERATURE MEASUREMENT FUNCTION

(71) Applicant: SHENYANG TAIHE METALLURGICAL MEASUREMENT AND CONTROL TECHNOLOGIES CO., LTD., Liaoning (CN)

(72) Inventors: Qixian Xie, Liaoning (CN); Jiu Zhang, Liaoning (CN)

(73) Assignee: SHENYANG TAIHE METALLURGICAL MEASUREMENT AND CONTROL TECHNOLOGIES CO., LTD., Liaoning (CN)

( * ) Notice: Subject to any disclaimer, the term of this patent is extended or adjusted under 35 U.S.C. 154(b) by 804 days.

(21) Appl. No.: 17/423,358

(22) PCT Filed: Feb. 25, 2019

(86) PCT No.: PCT/CN2019/076022
§ 371 (c)(1),
(2) Date: Jul. 15, 2021

(87) PCT Pub. No.: WO2020/168580
PCT Pub. Date: Aug. 27, 2020

(65) Prior Publication Data
US 2022/0126360 A1    Apr. 28, 2022

(30) Foreign Application Priority Data
Feb. 22, 2019 (CN) .......................... 201910132256.0

(51) Int. Cl.
*G01K 1/14* (2021.01)
*B22D 2/00* (2006.01)
(Continued)

(52) U.S. Cl.
CPC ........... *B22D 41/186* (2013.01); *B22D 2/006* (2013.01); *G01K 1/08* (2013.01); *G01K 1/10* (2013.01); *G01K 1/125* (2013.01); *G01K 1/14* (2013.01)

(58) Field of Classification Search
CPC ...... B22D 41/165; B22D 2/006; G01K 1/125; G01K 1/08; G01K 1/10; G01K 1/14
(Continued)

(56) References Cited

U.S. PATENT DOCUMENTS

| | | | | |
|---|---|---|---|---|
| 2,706,411 A | * | 4/1955 | Bircher ..................... | G01K 1/08 374/140 |
| 3,763,704 A | * | 10/1973 | Blau ........................ | G01K 7/08 266/226 |
| 4,261,202 A | * | 4/1981 | Kawamoto ............ | G01N 25/04 374/139 |

FOREIGN PATENT DOCUMENTS

| | | |
|---|---|---|
| CN | 1936524 A | 3/2007 |
| CN | 101337273 A | 1/2009 |

(Continued)

OTHER PUBLICATIONS

U.S. Appl. No. 17/423,358, filed Jun. 5, 2024_CN_100580396_C_H.pdf, Jan. 13, 2010.*

(Continued)

*Primary Examiner* — Gail Kaplan Verbitsky
(74) *Attorney, Agent, or Firm* — NKL Law; Allen Xue

(57) ABSTRACT

A ventilating stopper rod has a temperature measurement function and is used for continuous casting. The stopper rod has a rod body, a rod head, a temperature measurement unit, a connecting pipe and exhaust passages; the rod body is a hollow structure; the upper end of the rod body is connected with the connecting pipe; the lower end of the rod body is connected with the rod head; the temperature measurement unit is used for measuring the temperature of the molten (Continued)

steel; the open end of the temperature measurement unit is connected with the rod head and communicates with the inner cavity of the rod body; the closed end of the temperature measurement unit extends out from the lower end of the rod head and is exposed from the rod head.

9 Claims, 2 Drawing Sheets

(51) Int. Cl.
 *B22D 41/18* (2006.01)
 *G01K 1/08* (2021.01)
 *G01K 1/10* (2006.01)
 *G01K 1/12* (2006.01)

(58) Field of Classification Search
 USPC .......................... 374/139, 141, 179; 136/234
 See application file for complete search history.

(56) References Cited

FOREIGN PATENT DOCUMENTS

| | | | | | |
|---|---|---|---|---|---|
| CN | 100580396 | C | * | 1/2010 | |
| CN | 101109660 | B | * | 7/2010 | |
| CN | 102308191 | A | * | 1/2012 | ............ B22D 1/005 |
| CN | 104245185 | A | * | 12/2014 | ............ B22D 1/005 |
| CN | 204052882 | U | | 12/2014 | |
| CN | 204381357 | U | | 6/2015 | |
| CN | 206356576 | U | | 7/2017 | |
| CN | 206648740 | U | * | 11/2017 | |
| CN | 207479590 | U | | 6/2018 | |
| CN | 207649774 | U | * | 7/2018 | |
| CN | 108588438 | A | * | 9/2018 | ........... C22B 21/064 |
| CN | 208155483 | U | * | 11/2018 | |
| CN | 208322095 | U | * | 1/2019 | ............ B22D 2/001 |
| CN | 109773172 | A | * | 5/2019 | |
| CN | 110487413 | A | * | 11/2019 | |
| EP | 2338621 | A1 | | 6/2011 | |
| JP | H05261470 | A | * | 10/1993 | |
| JP | H0789087 | B2 | * | 9/1995 | |
| JP | H085464 | A | * | 1/1996 | |
| JP | 2922830 | B2 | * | 7/1999 | |

OTHER PUBLICATIONS

U.S. Appl. No. 17/423,358, filed Jun. 5, 2024_CN_102308191_A_H.pdf,Jan. 4, 2012.*
U.S. Pat. No. 7,423,358_Jun. 5, 2024_CN_104245185_A_H.pdf,Dec. 24, 2014.*
U.S. Appl. No. 17/423,358, filed Jun. 5, 2024_CN_108588438_A_H.pdf,Sep. 28, 2018.*
U.S. Appl. No. 17/423,358, filed Jun. 5, 2024_CN_109773172_A_H.pdf,May 21, 2019.*
U.S. Pat. No. 7,423,358_Jun. 5, 2024_CN_207649774_U_H.pdf,May 21, 2019.*
U.S. Appl. No. 17/423,358, filed Jun. 5, 2024_CN_208155483_U_H.pdf,Jul. 24, 2018.*
U.S. Appl. No. 17/423,358, filed Jun. 5, 2024_CN_208322095_U_H.pdf,Jan. 4, 2019.*
U.S. Appl. No. 17/423,358, filed Jun. 5, 2024_JP_2922830_B2_H.pdf, Jul. 26, 1999.*
U.S. Appl. No. 17/423,358, filed Jun. 5, 2024_JP_H05261470_A_H.pdf, Oct. 12, 1993.*
U.S. Appl. No. 17/423,358, filed Jun. 5, 2024_JP_H0789087_B2_H.pdf, Sep. 27, 1995.*
U.S. Appl. No. 17/423,358, filed Jun. 5, 2024_JP_H085464_A_H.pdf, Jan. 12, 1996.*
U.S. Appl. No. 17/423,358, filed Aug. 28, 2024_CN_102308191_A_H.pdf,Jan. 4, 2012.*
U.S. Appl. No. 17/423,358, filed Aug. 28, 2024_CN_110487413_A_H.pdf,Nov. 22, 2019.*
U.S. Appl. No. 17/423,358, filed Aug. 28, 2024_CN_101109660_B_H.pdf,Jul. 21, 2010.*
U.S. Appl. No. 17/423,358, filed Aug. 28, 2024_CN_206648740_U_H.pdf,Nov. 17, 2017.*

\* cited by examiner

VENTILATING STOPPER ROD WITH TEMPERATURE MEASUREMENT FUNCTION

TECHNICAL FIELD

The present invention relates to the technical field of metallurgical continuous casting, and particularly to a ventilating stopper rod with a temperature measurement function.

BACKGROUND

Continuous casting is a key technology in steel production, which converts liquid molten steel into casting blanks. Flow control and temperature measurement has been two key problems in continuous casting production.

Molten steel flows out from a continuous casting tundish and enters a continuous casting crystallizer through a water inlet for solidification. The temperature of the molten steel at the outlet of the tundish is the most instructive temperature for controlling the superheat degree and the solidification quality of the molten steel in the whole tundish.

The liquid level of the molten steel in the crystallizer is a key parameter which affects the quality of the casting blanks, and is controlled by the flow rate of the molten steel flowing out of the tundish. The flow rate of the molten steel is controlled by controlling a gap between the stopper rod and the water inlet.

In the casting process of continuous casting, the molten steel usually contains slag inclusions, and especially killed steel, such as high aluminum steel, has high content of slag inclusions. The harm of the slag inclusions is: on one hand, the slag inclusions in the molten steel are easy to accumulate at the water inlet at the bottom end of the stopper rod. When too many slag inclusions are accumulated, the water inlet is blocked, which affects the control of the flow rate of the molten steel. Generally, blockage is prevented by blowing argon at the bottom end of the stopper rod. On the other hand, if the slag inclusions enter the crystallizer with the molten steel and are solidified into the casting blanks with the molten steel, the defects of the casting blanks are formed. Argon blowing at the bottom end of the stopper rod is conducive to the floating of the slag inclusions to facilitate the removal of the slag inclusions. Therefore, it is necessary to solve the problems of temperature measurement at the outlet of the continuous casting tundish, blockage prevention at the water inlet and removal of the slag inclusions in the molten steel.

To solve the temperature measurement problem, researchers of Chinese patents CN1936524A and CN101337273A have installed thermocouples or infrared temperature measurement probes into airtight stopper rods to realize temperature measurement. The technical solution has two problems: firstly, a rod head of the stopper rod is made into a thick-walled structure for scouring prevention, causing serious hysteresis of temperature measurement response and difficulty in satisfying the technical control requirements. Secondly, the technical solution can only be used for the stopper rod without air hole. When the stopper rod has an air hole, the rod head is cooled due to blowing of argon, and the temperature of the molten steel cannot be measured.

In conclusion, the existing technical solution is difficult to solve the problems of temperature measurement at the outlet of the continuous casting tundish, blockage prevention at the water inlet and removal of the slag inclusions while controlling the flow.

SUMMARY

The purpose of the present invention is to provide a ventilating stopper rod with a temperature measurement function. By designing a temperature sensing element and exhaust passages in the stopper rod, the functions of rapid temperature measurement at an outlet of a tundish, blockage prevention at a water inlet and slag inclusion removal are realized, while controlling the flow rate of molten steel. Meanwhile, the design of the exhaust passages can realize the functions of eliminating smoke gas generated in an inner cavity of the stopper rod and cleaning a temperature measurement light path.

To achieve the above purpose, the present invention adopts the following technical solution:

A ventilating stopper rod with a temperature measurement function, characterized in that the stopper rod comprises a rod body, a rod head, a temperature measurement unit, a connecting pipe and exhaust passages; wherein the rod body is a hollow structure; the upper end of the rod body is connected with the connecting pipe; the lower end of the rod body is connected with the rod head; the temperature measurement unit is used for measuring the temperature of the molten steel and is a tubular structure with a closed end and an open end; the open end of the temperature measurement unit is connected with the rod head and communicated with the inner cavity of the rod body; the closed end of the temperature measurement unit extends out from the lower end of the rod head and is exposed from the rod head; a plurality of exhaust passages are arranged; inlet ends of the exhaust passages are communicated with the inner cavity of the rod body or the inner cavity of the rod head; and outlet ends of the exhaust passages are connected with the outer surface of the rod head and communicated with the outside.

The exhaust passages are distributed around the temperature measurement unit; the inlet ends of the exhaust passages are located above the open end of the temperature measurement unit, i.e., a distance $L_2$ from the inlet ends of the exhaust passages to the open end of the temperature measurement unit is greater than or equal to 0 mm, and $L_2$ is preferably 20-250 mm.

A distance $L_3$ from the outlet ends of the exhaust passages to the outer surface of the temperature measurement unit is greater than or equal to 5 mm.

The temperature measurement unit is a blackbody cavity type temperature measurement sensor; the wall thickness of the temperature measurement unit is 2.0-10.0 mm, and an inner diameter is 10.0-30.0 mm; the ratio of the length $L_1$ of the exposed part of the rod head of the temperature measurement unit to the inner diameter $\Phi_0$ of the temperature measurement unit is $L_1/\Phi_0=1.0$-15.0, preferably 1.0-10.0; the temperature measurement unit is inserted into the molten steel as a temperature sensor; and when the temperature measurement unit is heated by the molten steel and achieves heat balance, the temperature of the molten steel can be sensed based on a blackbody cavity principle and stable heat radiation energy can be emitted.

The wall thickness of the temperature measurement unit is 2.0-10.0 mm, and the inner diameter is 10.0-30.0 mm; and the ratio of the length $L_1$ of the exposed part of the rod head of the temperature measurement unit to the inner diameter $\Phi_0$ of the temperature measurement unit is $L_1/\Phi_0=1.0$-15.0, preferably 1.0-10.0.

The length of the exposed rod head of the temperature measurement unit is 10.0 mm-150.0 mm, preferably 20.0 mm-100.0 mm.

The temperature measurement unit is a cermet tube, specifically Mo—$ZrO_2$, W—$ZrO_2$ or Mo—W—$ZrO_2$.

The connecting mode of the rod body and the connecting pipe is: the connecting pipe extends into the upper part of the inner cavity of the rod body, and the connecting pipe is fixedly connected with the rod body through a positioning connecting nut.

The temperature measurement unit, the rod body, the rod head and the connecting pipe are coaxial, and the connecting pipe, the inner part of the rod body, the inner part of the rod head and the exhaust passages form a ventilation structure.

The present invention has the following advantages and beneficial effects:

1. The stopper rod provided by the present invention is suitable for argon blowing in the casting process of the molten steel in continuous casting, can realize the control of the flow rate of the molten steel at the outlet of the tundish and continuous and quick temperature measurement of the molten steel at the water inlet of the outlet of the tundish, and can also realize the functions of argon blowing for prevention of blockage, removal of slag inclusion and discharge of smoke gas in the inner cavity of the stopper rod for cleaning the temperature measurement light path.
2. After the temperature measurement unit of the present invention adopts specific material, the wall thickness of the temperature measurement unit is reduced. The thin-walled temperature measurement unit is compounded at the bottom of the rod head to realize continuous and rapid temperature measurement of the molten steel near the water inlet at the outlet of the tundish.
3. The exhaust passages are arranged in the present invention. On one hand, argon is blown from the exhaust passages to remove the smoke gas from the inner cavity of the stopper rod to clean the temperature measurement light path; and on the other hand, the argon blown from the exhaust passages can prevent the inclusions from being accumulated at the water inlet to prevent blockage, and promote the inclusions in the molten steel to float.

In the figures: 1—temperature measurement unit; 2—rod head; 3—rod body; 4—positioning connecting nut; 5—connecting pipe; 6—exhaust passage; 7—tundish; 8—water inlet; 9—molten steel.

DETAILED DESCRIPTION

The present invention will be further described below in combination with the drawings and embodiments. Apparently, the described embodiments are merely part of the embodiments of the present invention, not all of the embodiments.

Figure 1:
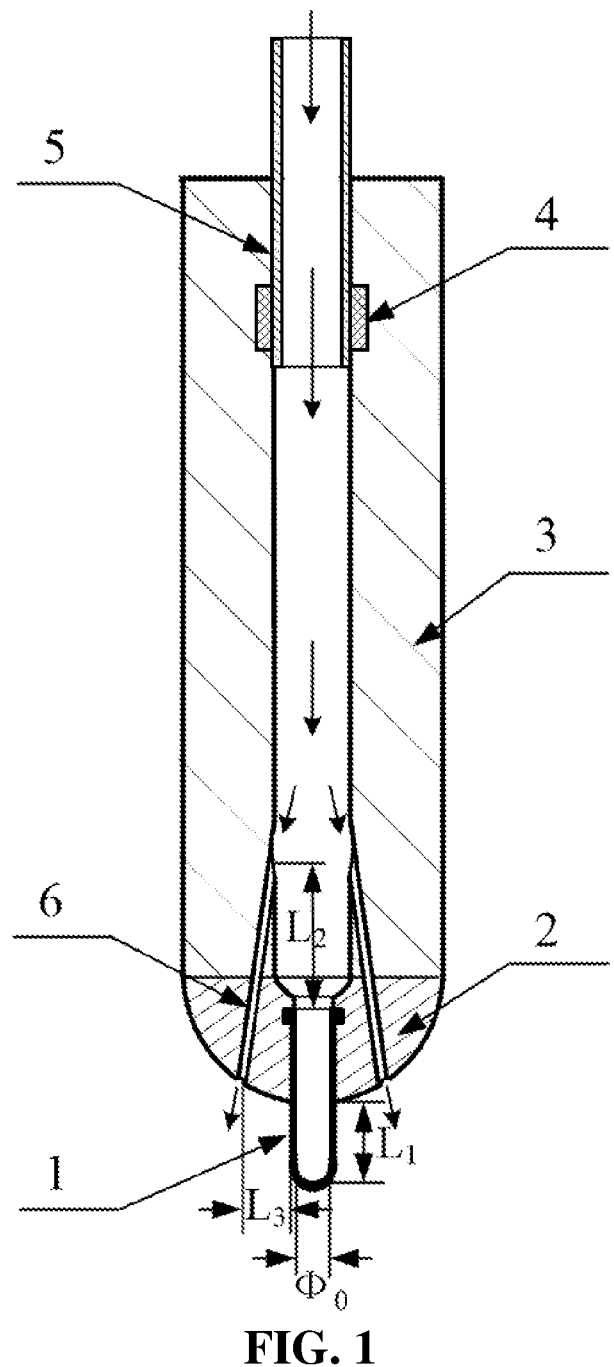
FIG. 1 is a structural schematic diagram of a ventilating stopper rod with a temperature measurement function in the present invention.

The present invention discloses a ventilating stopper rod with a temperature measurement function, as shown in FIG. 1. The stopper rod comprises a rod body 3, a rod head 2, a temperature measurement unit 1, a connecting pipe 5 and exhaust passages 6; the rod body 3 is a hollow structure; the connecting pipe 5 extends into the upper end of the rod body and is fixedly connected with the rod body through a positioning connecting nut 4; the lower end of the rod body 3 is connected with the rod head 2; the temperature measurement unit 1 is a tubular structure with a closed end and an open end; the open end of the temperature measurement unit 1 is connected with the rod head 2 and communicated with the inner cavity of the rod body; the closed end of the temperature measurement unit 1 extends out from the lower end of the rod head and is exposed from the rod head; in temperature measurement, the temperature measurement unit 1 is heated by the molten steel which emits stable heat radiation energy based on the blackbody cavity temperature measurement principle.

The structure of the rod head is shown in FIG. 1. The upper part of the rod head is provided with an inner cavity. The open end of the temperature measurement unit 1 is communicated with the inner cavity of the rod body through the inner cavity of the rod head.

The temperature measurement unit 1 is a blackbody cavity type temperature measurement sensor. The temperature measurement unit is inserted into the molten steel as a temperature sensor. When the temperature measurement unit is heated by the molten steel and achieves heat balance, the temperature of the molten steel can be sensed based on the blackbody cavity principle and stable heat radiation energy can be emitted. The heat radiation is received by a photoelectric detector system and converted into an electrical signal which is amplified by a preamplifier and sent to a signal processor. The signal processor using a single chip computer as a core determines the actual temperature of the molten steel according to an online blackbody theory and displays the actual temperature.

In the prior art, the rod head and the blackbody cavity type temperature measurement sensor of the molten steel are generally made of carbon containing refractory materials such as aluminum carbon, magnesium carbon or zirconium carbon. The rod head in the present invention is still made of carbon containing refractory materials such as aluminum carbon, magnesium carbon or zirconium carbon; the temperature measurement unit 1 is a tubular structure made of cermet; and the material can be selected from Mo—$ZrO_2$, W—$ZrO_2$ or Mo—W—$ZrO_2$, wherein the volume ratio of metal to ceramic content is 0.6-1.5. Compared with the carbon containing refractory materials such as aluminum carbon, magnesium carbon and zirconium carbon used in the rod head, the temperature measurement unit made by the material of the present invention has higher strength, higher compactability and higher anti-scouring performance, and can satisfy the life requirement of long-term scouring and corrosion resistance at the water inlet of the outlet of the tundish through thinner wall thickness. The thin-walled structure of the temperature measurement unit 1 is the basis of rapid and continuous temperature measurement.

The wall thickness of the temperature measurement unit in the present invention is preferably 2.0-10.0 mm, and preferably 2.5-7.0 mm, such as 2.5 mm, 3.0 mm, 6.0 mm and 7.0 mm.

The rod head 2 and the rod body 3 can be made of the same material or different materials. For example, the rod head and the rod body are made of aluminum carbon material, or the rod head is made of magnesium carbon material and the rod body is made of aluminum carbon material.

The rod head 2 and the rod body 3 can be formed integrally.

A plurality of exhaust passages are distributed around the temperature measurement unit 1, and preferably uniformly distributed. Preferably, the quantity of the exhaust passages 6 may be 2, 5, 9, 30, 100, 150 and the like.

In the process of continuous casting, the inner cavity of the stopper rod can generate smoke gas under the action of high temperature and the generated smoke gas blocks the temperature measurement light path. In the structural design of the stopper rod in the present invention, the temperature measurement unit 1, the rod head 2, the rod body 3 and the connecting pipe 5 are designed to be coaxial to ensure alignment of the temperature measurement light path, and the connecting pipe 5, the exhaust passages 6, the inner part of the rod body 3 and the inner part of the rod head 2 are communicated to form a ventilation structure. In the design, while blowing argon to prevent blockage and remove slag inclusions, the smoke gas generated in the inner cavity of the stopper rod can be removed to clean the temperature measurement light path.

The arrangement of the exhaust passages of the present invention needs to consider minimizing the influence of argon blowing on the temperature field of the temperature measurement unit.

Based on the above purpose, specific measures adopted in the present invention are as follows:

Inlet ends of the exhaust passages 6 are communicated with the inner cavity of the rod body 3 or the inner cavity of the rod head 2; and outlet ends of the exhaust passages 6 are connected with the outer surface of the rod head 2 and communicated with the outside. The exhaust passages are preferably arranged radially.

The inlet ends of the exhaust passages 6 are located above the open end of the temperature measurement unit 1, i.e., a distance $L_2$ from the inlet ends of the exhaust passages 6 to the open end of the temperature measurement unit 1 is greater than 0 mm, and $L_2$ is preferably 20-250 mm, such as 20 mm, 50 mm, 80 mm, 150 mm and 200 mm. In a preferred solution, a certain distance is kept between the inlet ends of the exhaust passages 6 and the open end of the temperature measurement unit 1 to reduce the influence of argon blowing on the temperature field of the temperature measurement unit.

A distance $L_3$ from the outlet ends of the exhaust passages 6 to the outer surface of the temperature measurement unit 1 is greater than or equal to 5 mm, such as 5 mm, 10 mm, 15 mm and 30 mm. A certain distance is kept between the outlet ends of the exhaust passages 6 and the temperature measurement unit 1 to reduce the influence of argon blowing through the exhaust passages on the temperature field of the temperature measurement unit 1.

The length of the exposed rod head 2 of the temperature measurement unit 1 in the present invention is 10.0 mm-150.0 mm, preferably 20.0 mm-100.0 mm, such as 20.0 mm, 30.5 mm, 50.7 mm, 80.0 mm and 100.0 mm.

To further ensure the accuracy of temperature measurement, the ratio of length to diameter of the temperature measurement unit 1 needs to satisfy certain conditions to satisfy the isothermal sealing conditions of the blackbody cavity temperature measurement principle. In the present invention, the ratio of the length $L_1$ of the exposed part of the rod head 2 of the temperature measurement unit 1 to the inner diameter $\Phi_0$ of the temperature measurement unit 1 is $L_1/\Phi_0$=1.0-15.0, preferably 1.0-10.0, such as $L_1/\Phi_0$: 1.5, 2.1, 2.8, 6.5, 8.3, 9.1 and 10.0.

The inner diameter of the temperature measurement unit is 10-30 mm, preferably 15 mm-25 mm, such as 15.0 mm, 17.5 mm, 22.0 mm and 25.0 mm.

Figure 2:
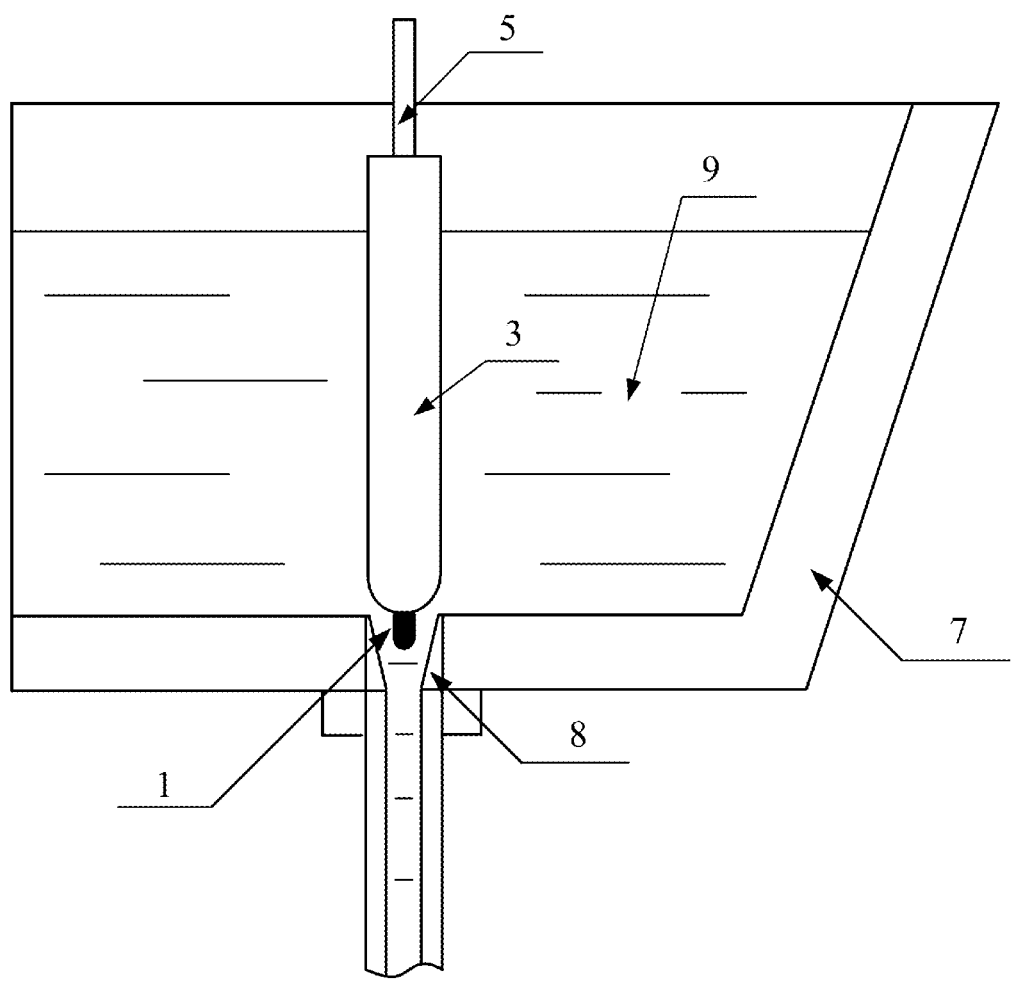
FIG. 2 is a schematic diagram of a use process of a ventilating stopper rod with a temperature measurement function in the present invention.

The use process of the above stopper rod in the present invention is shown in FIG. 2. In the use process, the stopper rod with the temperature measurement function is installed above the water inlet 8 at the outlet of the continuous casting tundish 7. A temperature measurement probe (not shown) obtains the temperature of the molten steel after calculation and analysis by receiving the heat radiation energy emitted by the temperature measurement unit 1. The flow rate of the molten steel is controlled by controlling the distance between the rod head 2 and the water inlet 8. Ar is blown out from the exhaust passages 6 arranged on the rod body 3 and rod head 2 to prevent the slag inclusions from being accumulated at the water inlet to prevent blockage, promote the floating of the inclusions in the molten steel and remove the smoke gas generated in the inner cavity of the stopper rod to clean the temperature measurement light path.

We claim:

1. A ventilating stopper rod with a temperature measurement function, comprising a rod body (3), a rod head (2), a temperature measurement unit (1), a connecting pipe (5), and a plurality of exhaust passages (6),
   wherein the rod body (3) is a hollow structure having an upper end of the rod body connected to the connecting pipe (5) and a lower end connected to the rod head (2),
   the temperature measurement unit (1) has a tubular structure having an open end connected with the rod head (2) and in communication with the inner cavity of the rod body (3) and a closed end extending out from the lower end of the rod head (2) such that a portion of the temperature measurement unit (1) is exposed,
   each of the plurality of exhaust passages (6) has an inlet opening at the inner cavity of the rod body (3) or the rod head (2), and an outlet end opening at an outer surface of the rod head (2).

2. The ventilating stopper rod with the temperature measurement function according to claim 1, wherein the inlet of each exhaust passage (6) is located above the open end of the temperature measurement unit (1), and a distance $L_2$ from the inlet of each exhaust passage to the open end of the temperature measurement unit (1) in a range of 20-250 mm.

3. The ventilating stopper rod with the temperature measurement function according to claim 1, wherein a distance $L_3$ from the outlet of each exhaust passage (6) to the outer surface of the temperature measurement unit (1) is greater than or equal to 5 mm.

4. The ventilating stopper rod with the temperature measurement function according to claim 1, wherein the temperature measurement unit (1) is a blackbody cavity type temperature measurement sensor having a wall thickness of 2.0-10.0 mm and an inner diameter of 10.0-30.0 mm, a ratio of a length $L_1$ of the exposed portion of the temperature measurement unit (1) to the inner diameter $\Phi_0$ of the temperature measurement unit (1) is $L_1/\Phi_0$=1.0-15.0.

5. The ventilating stopper rod with the temperature measurement function according to claim 1, wherein the length of the exposed rod head (2) of the temperature measurement unit (1) is 10.0 mm-150.0 mm.

6. The ventilating stopper rod with the temperature measurement function according to claim 1, wherein the temperature measurement unit (1) is a cermet tube made of Mo—$ZrO_2$, W—$ZrO_2$ or Mo—W—$ZrO_2$.

7. The ventilating stopper rod with the temperature measurement function according to claim 1, wherein the connecting pipe (5) extends into the upper part of the inner cavity of the rod body, and is fixedly connected with the rod body through a positioning connecting nut (4).

8. The ventilating stopper rod with the temperature measurement function according to claim 1, wherein the temperature measurement unit (1), the rod body (3), the rod head (2) and the connecting pipe (5) are coaxially arranged, and the connecting pipe (5), the inner part of the rod body (3), the inner part of the rod head (2) and the plurality of exhaust passages (6) form a path for ventilation.

9. The ventilating stopper rod with the temperature measurement function according to claim 1, wherein a number of the plurality of exhaust passages is 2 to 150, and the plurality of exhaust passages are evenly distributed around the temperature measurement unit (1).

\* \* \* \* \*